United States Patent
Chen et al.

(10) Patent No.: US 10,176,208 B2
(45) Date of Patent: Jan. 8, 2019

(54) PROCESSING TIME SERIES DATA FROM MULTIPLE SENSORS

(71) Applicant: International Business Machines Corporation, Armonk, NY (US)

(72) Inventors: Xiao Yan Chen, Beijing (CN); Sheng Huang, Shanghai (CN); Kai Liu, Beijing (CN); Chen Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/450,606

(22) Filed: Mar. 6, 2017

(65) Prior Publication Data
US 2017/0177646 A1    Jun. 22, 2017

Related U.S. Application Data

(63) Continuation of application No. 14/068,559, filed on Oct. 31, 2013, now Pat. No. 9,645,736.

(30) Foreign Application Priority Data

Oct. 31, 2012 (CN) ............... 2012 1 0429532

(51) Int. Cl.
G06F 17/30        (2006.01)
(52) U.S. Cl.
CPC .. *G06F 17/30353* (2013.01); *G06F 17/30312* (2013.01); *G06F 17/30551* (2013.01)
(58) Field of Classification Search
CPC .. G06F 3/06; G06F 17/30424; G06F 11/3476; G06F 17/18; H04L 67/12; G06Q 40/04
(Continued)

(56) References Cited

U.S. PATENT DOCUMENTS 5,528,516 A * 6/1996 Yemini ............... G06F 11/2257
                                                      702/181
5,600,576 A * 2/1997 Broadwater ........... G01D 9/005
                                                      702/187
(Continued)

FOREIGN PATENT DOCUMENTS

CN    101923569 A    12/2010
CN    101984421 A    3/2011
(Continued)

OTHER PUBLICATIONS

Chardin et al., "Data Historians in the Data Management Landscape", TPCTC Technology Conference on Performance Evaluation and Benchmarking; Aug. 27, 2013; http://liris.cnrs.fr/Documents/Liris-5701.pdf.
(Continued)

*Primary Examiner* — An T Nguyen
(74) *Attorney, Agent, or Firm* — Scully, Scott, Murphy & Presser, P.C.; David Quinn, Esq.

(57) ABSTRACT

Processing time sequence data for multiple sensors, wherein the multiple sensors are divided into multiple sensor groups and each data comprises a time stamp and a value associated with the timestamp. The method comprises: receiving time series data from each sensor; assigning the time series data received to a sensor group to which the sensor belongs; storing time series data in a first database of a first memory, such that multiple time series data assigned to the same sensor group in the multiple sensor groups are stored in at least one database record of the first database; obtaining the time series data of each sensor among the multiple sensors from the first database; storing time series data in a second database of a second memory, such that the multiple time series data from the same sensor are stored in at least one database record of the second database.

18 Claims, 6 Drawing Sheets

(58) Field of Classification Search
USPC ........................................................ 702/181
See application file for complete search history.

(56) References Cited

U.S. PATENT DOCUMENTS

| | | | | |
|---|---|---|---|---|
| 5,621,668 A * | 4/1997 | Nakata | ............... | G05B 23/0232 |
| | | | | 700/80 |
| RE35,793 E * | 5/1998 | Halpern | ............... | G01R 21/133 |
| | | | | 324/113 |
| 6,278,961 B1 * | 8/2001 | Kadtke | ............... | G06K 9/6217 |
| | | | | 702/189 |
| 6,351,713 B1 * | 2/2002 | Board | ............... | G01M 13/028 |
| | | | | 702/181 |
| 6,477,485 B1 * | 11/2002 | Radulovic | ........... | G06K 9/6284 |
| | | | | 702/183 |
| 6,633,578 B1 | 10/2003 | Matsumaru et al. | | |
| 6,892,163 B1 * | 5/2005 | Herzog | ............... | G06K 9/6278 |
| | | | | 700/30 |
| 7,433,527 B2 | 10/2008 | Takayama et al. | | |
| 7,676,288 B2 | 3/2010 | Middleton, Jr. | | |
| 8,051,045 B2 | 11/2011 | Vogler | | |
| 8,065,011 B2 * | 11/2011 | Echauz | ............... | A61B 5/0482 |
| | | | | 607/139 |
| 8,112,425 B2 | 2/2012 | Baum et al. | | |
| 8,260,783 B2 | 9/2012 | Milam | | |
| 8,682,618 B2 * | 3/2014 | Borlee | ................ | G01D 4/004 |
| | | | | 702/187 |
| 9,334,718 B2 | 5/2016 | Valero et al. | | |
| 9,355,112 B1 * | 5/2016 | Armangau | ........ | G06F 17/30153 |
| 9,405,283 B1 | 8/2016 | Damico | | |
| 2003/0068097 A1 * | 4/2003 | Wilson | ................ | G06F 17/18 |
| | | | | 382/276 |
| 2004/0010374 A1 * | 1/2004 | Raghuraman | ........... | E21B 47/00 |
| | | | | 702/13 |
| 2005/0107723 A1 * | 5/2005 | Wehman | ............... | A61B 5/1118 |
| | | | | 600/595 |
| 2006/0006997 A1 * | 1/2006 | Rose-Pehrsson | ...... | G08B 17/00 |
| | | | | 340/522 |
| 2008/0252433 A1 * | 10/2008 | Yguel | ................... | G08G 1/161 |
| | | | | 340/435 |
| 2009/0300417 A1 * | 12/2009 | Bonissone | ......... | G05B 23/0254 |
| | | | | 714/26 |
| 2010/0211618 A1 | 8/2010 | Anderson et al. | | |
| 2010/0325132 A1 * | 12/2010 | Liu | ................... | G06F 17/30516 |
| | | | | 707/759 |
| 2011/0282836 A1 | 11/2011 | Erickson et al. | | |
| 2011/0292764 A1 * | 12/2011 | Kelly | ..................... | G01V 1/307 |
| | | | | 367/38 |
| 2012/0265737 A1 * | 10/2012 | Potkonjak | .............. | H03M 7/30 |
| | | | | 707/693 |
| 2013/0262032 A1 * | 10/2013 | Ide | ......................... | G01S 19/34 |
| | | | | 702/181 |
| 2013/0289927 A1 * | 10/2013 | Smith | ..................... | G06F 17/18 |
| | | | | 702/130 |
| 2014/0122022 A1 * | 5/2014 | Chen | ...................... | H04L 67/12 |
| | | | | 702/181 |
| 2014/0156227 A1 * | 6/2014 | Grant | ..................... | G01D 21/00 |
| | | | | 702/187 |
| 2017/0177646 A1 * | 6/2017 | Chen | ................ | G06F 17/30353 |
| 2018/0157693 A1 | 6/2018 | Swan et al. | | |

FOREIGN PATENT DOCUMENTS

| | | |
|---|---|---|
| CN | 102006081 A | 4/2011 |
| JP | 2006338373 A | 12/2006 |

OTHER PUBLICATIONS

Schmidt et al., "Parameter Estimation for Interactive Visualisation of Scientific Data", A DB Technical Report, Feb. 10, 2004, pp. 1-21.
"List of IBM Patents or Patent Applications Treated as Related".

* cited by examiner

| ID | TS | V |
|---|---|---|
| 1 | 20120716.10:47:00 | 32.0 |
| 2 | 20120716.10:47:10 | 31.8 |
| 3 | 20120716.10:47:10 | 31.0 |
| 4 | 20120716.10:47:20 | 31.9 |
| 5 | 20120716.10:47:20 | 32.5 |
| 6 | 20120716.10:47:30 | 31.7 |
| 7 | 20120716.10:47:20 | 31.3 |
| 8 | 20120716.10:47:30 | 31.4 |
| 9 | 20120716.10:47:30 | 32.2 |
| 10 | 20120716.10:47:40 | 32.2 |
| ... | ... | ... |

Table 411

| Number | TS | V |
|---|---|---|
| 1 | 20120806.10:00:00 | 3 |
| 2 | 20120806.10:00:01 | 3.3 |
| 3 | 20120806.10:00:02 | 3.6 |
| 4 | 20120806.10:00:03 | 3.5 |
| 5 | 20120806.10:00:04 | 4 |
| 6 | 20120806.10:00:05 | 4 |
| 7 | 20120806.10:00:06 | 3.85 |
| 8 | 20120806.10:00:07 | 3.7 |
| 9 | 20120806.10:00:08 | 3.9 |
| 10 | 20120806.10:00:09 | 3.7 |
| 11 | 20120806.10:00:10 | 3.5 |
| 12 | 20120806.10:00:11 | 3.05 |
| 13 | 20120806.10:00:12 | 2.85 |
| 14 | 20120806.10:00:13 | 2.15 |
| 15 | 20120806.10:00:14 | 2 |
| 16 | 20120806.10:00:15 | 2.2 |
| 17 | 20120806.10:00:16 | 2.25 |
| 18 | 20120806.10:00:17 | 2.5 |
| 19 | 20120806.10:00:18 | 2.6 |
| 20 | 20120806.10:00:19 | 2.63 |
| 21 | 20120806.10:00:20 | 3 |
| 22 | 20120806.10:00:21 | 3.6 |
| 23 | 20120806.10:00:22 | 3.7 |
| 24 | 20120806.10:00:23 | 4.2 |
| 25 | 20120806.10:00:24 | 4.7 |
| 26 | 20120806.10:00:25 | 5 |

Table 412

Fig.4

| 501A | 504A |
|---|---|
| G_ID | <ID,V,T>, <ID,V,T>, ...<ID,V,T> |

Fig.5A

| 501 | 502 | 503 | 504 |
|---|---|---|---|
| G_ID | Base_TS | P_Counter | P_Blob |

| 601 | 602 | 603 | 604 |
|---|---|---|---|
| ID | Base_TS | V_Counter | V_Blob |

PROCESSING TIME SERIES DATA FROM MULTIPLE SENSORS

BACKGROUND OF THE INVENTION

The present invention relates to time series data processing, and more specifically, to storing in a database time series data from sensors.

In various industrial applications, it is needed to process massive time series data (such as stock price fluctuation, temperature change, and the like) from a large number of sensors. Time series data comprises timestamps and values associated with the timestamps, for example, comprising sampling time and sample values from sensors. In applications such as the energy system, intelligent power grid, etc., millions of sensors are usually deployed. These sensors generate massive time series data that are required to be persistently stored in a database for query. Before persistently storing time series data, it is first required to receive time series data in real-time from sensors and temporarily store the received time series data in a database of a temporary memory. The time series data are generally organized and stored temporarily according to individual sensors. This approach, although straightforward, has low utilization efficiency of buffers, and in particular so when processing massive time series data from a considerable number of low-frequency sampling sensors.

SUMMARY OF THE INVENTION

In view of the state of prior art, one objective of the present invention is to provide an improved method and apparatus for processing time series data from multiple sensors.

According to one aspect, there is provided a method for processing time series data from multiple sensors, wherein the multiple sensors are divided into multiple sensor groups and each time series data comprises a time stamp and a value associated with the timestamp, the method comprising: a data receiving step of receiving time series data from each sensor of the multiple sensors; a data grouping step of assigning the time series data received from each sensor to a sensor group to which the sensor belongs among the multiple sensor groups; a first storing step of storing time series data in a first database of a first memory, such that multiple time series data assigned to the same sensor group in the multiple sensor groups are stored in at least one database record of the first database; a data re-organizing step of obtaining the time series data of each sensor among the multiple sensors from the first database; a second storing step of storing time series data in a second database of a second memory, such that the multiple time series data from the same sensor are stored in at least one database record of the second database.

According to another aspect, there is provided an apparatus for processing time series data from multiple sensors, wherein the multiple sensors are divided into multiple sensor groups and each time series data comprises a time stamp and a value associated with the timestamp, the apparatus comprising: a data receiving module configured to receive time series data from each sensor of the multiple sensors; a data grouping module configured to assign the time series data received from each sensor to a sensor group to which the sensor belongs among the multiple sensor groups; a first storing control module configured to storing time series data in a first database of a first memory, such that multiple time series data assigned to the same sensor group in the multiple sensor groups are stored in at least one database record of the first database; a data re-organizing module configured to obtain the time series data of each sensor among the multiple sensors from the first database; and a second storing control module configured to store time series data in a second database of a second memory, such that the multiple time series data from the same sensor are stored in at least one database record of the second database.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 schematically shows an example of time series data from sensors;

FIGS. 5A and 5B schematically show database records in a first memory for storing time series data from multiple sensors according to the embodiments of the present invention;

FIGS. 6A and 6B schematically show database records of time series data as stored in a second memory according to one embodiment of the present invention;

DETAILED DESCRIPTION OF THE INVENTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
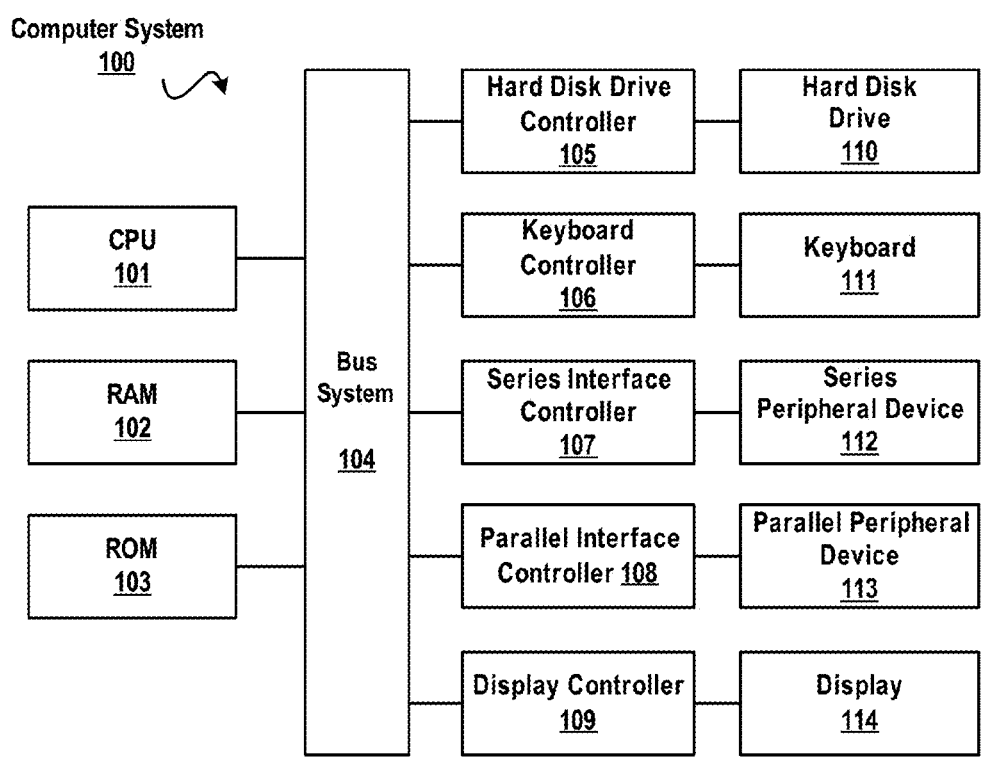
FIG. 1 shows a block diagram of an exemplary computer system 100 which is applicable to implement the embodiments of the present invention.

FIG. 1 shows a block diagram of an exemplary computer system 100 which is applicable to implement the embodiments of the present invention. As illustrated in FIG. 1, the computer system 100 may comprise: a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a monitor controller 109, a hard disk 110, a keyboard 111, a serial peripheral device 112, a parallel peripheral device 113 and a monitor 114. Among these components, connected to the system bus 104 are the CPU 101, the RAM 102, the ROM 103, the hard disk controller 105, the keyboard controller 106, the serial interface controller 107, the parallel interface controller 108 and the monitor controller 109. The hard disk 110 is coupled to the hard disk controller 105; the keyboard 111 is coupled to the keyboard controller 106; the serial peripheral device 112 is coupled to the serial interface controller 107; the parallel peripheral device 113 is coupled to the parallel interface controller 108; and the monitor 114 is coupled to the monitor controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The present invention relates to processing time series data, and the processing of time series data may be executed on the computer system 100 as shown in FIG. 1.

The general idea of the present invention lies in first temporarily storing time series data received from multiple sensors with relatively high efficiency based on characteristics of the time series data from multiple low-frequency sampling sensors, and then reorganizing the temporarily stored time series data, and then persistently storing the time series data according to a corresponding data structure. Further, the time series data are stored in a compression manner, thereby reducing the storage space for storing the time series data.

Hereinafter, various embodiments of the present invention will be depicted with reference to the accompanying drawings.

Figure 2:
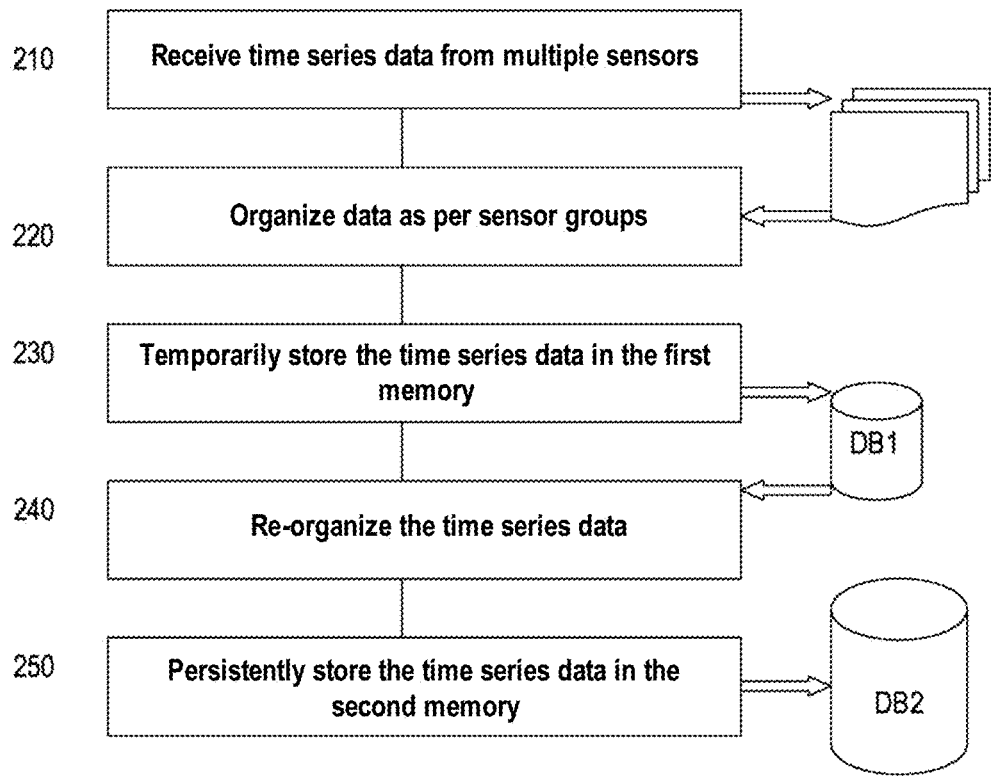
FIG. 2 schematically shows a flow chart of a method according to an embodiment of the present invention.

First, refer to FIG. 2. FIG. 2 schematically shows a flow chart of a method for processing time series data from multiple sensors according to one embodiment of the present invention.

The time series data processed according to the method of FIG. 2 come from multiple sensors (not shown), for example, from 1000 sensors. As an initialization step (not shown), the multiple sensors are divided into multiple sensor groups, for example, 1000 sensors are divided into 100 sensor groups, each sensor group including 10 sensors. The mapping relationship between sensor groups and sensors is recorded as below:

$$G1=\{1,2,\ldots 10\},\ldots G10=\{91,92,\ldots 100\},\ldots$$
$$G100=\{991,992,\ldots 1000\}$$

That is, the sensor group G1 comprises sensors 1, 2, . . . , and 10; the sensor group G10 comprises sensors 91, 92, . . . , and 100; and the sensor group G100 comprises sensors 991, 992, . . . , and 1000. Of course, such dividing manner is only exemplary. In practice, the number of sensors may be of tens of millions. Dividing parameters may be appropriately configured for example based on the sampling frequency of sensors according to the actual condition such that each sensor group comprises more, for example, hundreds of, or even thousands of sensors.

The time series data as processed according to the method shown in FIG. 2 all comprise a timestamp and a value associated with the timestamp. A timestamp represents sampling time of a value, simply denoted as "TS" or "T"; the value associated with the timestamp is also called a sampling value, simply denoted as "V." This specification also uses a two-tuple "<timestamp, value>" to indicate a pair of associated timestamp and value, also called "timestamp-value pair." For the convenience of depiction, without causing confusion, the value included in a time series data of a sensor is called "sensor value," and the time or timestamp included in a time series data of a sensor is called "sensor time."

Generally speaking, the method as shown in FIG. 2 comprises the following steps: a data receiving step 210, a data grouping step 220, a first storing step 230, a data re-organizing step 240, and a second storing step 250. Hereinafter, operations of respective steps will be depicted in detail with reference to other accompanying drawings.

The process of this method starts from the data receiving step 210, where time series data from each sensor of multiple sensors (not shown) are received.

FIG. 4 schematically shows time series data from a sensor, wherein table 411 schematically shows a part of time series data from multiple sensors, wherein the contents in the columns under headers "ID," "TS" and "V" are sensor ID, sensor timestamp, and sensor value, respectively. For example, the first line indicates that a sensor with an identifier "1" (sensor 1) measured the temperature value "32.0" at time "20120716.10:47:00."

After step 210, the data grouping step 220 is performed to assign the received time series data from each sensor to a sensor group to which the sensor belongs among the multiple sensor groups.

For example, the time series data from each sensor among 1000 sensors are assigned to sensor groups G1, G2, . . . , and G100, respectively. Suppose at a certain time, time series data assigned to the sensor group G1 are shown in table 411 in FIG. 4.

The time series data as shown in table 411 and the grouping of sensors are merely exemplary. In step 210, time series data from more sensors may be received. In the case of dividing the more sensors into a plurality of sensor groups, each received time series data belongs to one sensor group.

After step 220, a first storing step 230 is performed, where time series data are stored in a first database DB1 of a first memory, such that each database record of the first database includes multiple time series data assigned to same sensor group among the multiple sensor groups.

According to one embodiment of the present invention, the first memory is a temporary memory for temporarily storing data, which may be a volatile memory or a non-volatile memory. The first database for example may be a relational database (RDB).

Hereinafter, refer to FIGS. 5A and 5B, which further depict the implementation of step 230.

FIG. 5A schematically shows a structure of a database record according to one embodiment of the present invention. The database record as shown in FIG. 5A comprises:

(1) a group identifier (G_ID) 501A, which is a sensor group identifier corresponding to a database record.

(2) data portion 504A, comprising a plurality of three-tuples (ID, V, T), wherein ID represents a sensor ID; V and T represent the sensor value and timestamp, respectively, i.e., the value and timestamp in the time series data from the sensor. An additional counter may be provided in the database record to represent the number of three-tuples included in the data portion 504A.

For example, suppose a database record comprises time series data assigned to the sensor group G1 as shown in table 411, then the database record may be indicated as:

$$\{G1,<1,32.0,20120716.10{:}47{:}00>,\ldots<10,32.2,$$
$$20120716.10{:}47{:}40>\}$$

wherein G_ID="G1," and the three-tuple <1, 32.0, 20120716.10:47:00> denotes: the sensor 1 (ID=1), the value (V) "32.0" in the time series data of the sensor 1, and the timestamp (T) "20120716.10:47:00" corresponding to the value.

The database record stores time series data from multiple sensors.

According to one embodiment of the present invention, before the first storing step 230, the time series data may be compressed to generate compressed time series data. Correspondingly, in the first storing step, the storing time series data in the first database of the first memory comprises: storing the compressed time series data in the first database of the first memory.

Compressing time series data refers to converting raw time series data into compressed time series data. Note, the storage space required for storing the compressed time series data is much less than the storage space required for storing the raw time series data. Various data compressing methods in the prior art may be adopted to compress the time series data in table 411 to thereby generate the compressed time series data.

According to one embodiment of the present invention, the compressing the time series data comprises: compressing the time stamp in the time series data.

FIG. 5B schematically shows a structure of a database record for storing data in a compressed manner according to one embodiment of the present invention. The database record as shown in FIG. 5B comprises the following fields:

(1) a group identifier (G_ID) 501, denoting an identifier of the sensor group;

(2) a base timestamp (Base_TS) 502, denoting a base time;

(3) a point blob (P_Blob) 504, composed of a plurality of three-tuples <ID, V, $\Delta$t> 504_1. The meanings of "ID" and "V" in the three-tuple <ID, V, $\Delta$t> are identical to those of "ID" and "V" in the three-tuple <ID, V, $\Delta$t> as shown in FIG. 5A, and "$\Delta$t" denotes offset between the timestamp corresponding to "V" and the base timestamp 502. The timestamp corresponding to the value V may be derived from $\Delta$t and the base timestamp 502.

(4) a counter (P_Counter) 503, which denotes the number of three-tuple 504_1. For example, if the value of P_Counter 503 is 10, it indicates that the point blob 504 comprises 10 three-tuples 504_1. The number of three-tuples that may be accommodated in the point blob 504 is also dependent on the compression degree of the data in the database record or the data in the three tuple, as well as the maximum length of the database record; the larger the data compression rate is, the more is the number of the three tuples that may be accommodated.

For example, suppose a database record comprises time series data assigned to the sensor group G1 as shown in table 411, then the database record as shown in FIG. 5B may be indicated as:

{$G1$,20120716.10:47:00,10,$P\_Blob$},

Wherein P_Blob=<1,32.0,0>, <2,31.8,10>, <3,31.0,10> . . . <10,32.2,40>.

Compared with the database records as shown in FIG. 5A, the data in the database records as shown in FIG. 5B are compressed time series data that are generated through compressing the timestamps in the time series data. By adopting the compressing manner as shown in FIG. 5B, more time series data may be stored in a database record.

It should be noted that the data compressing manner as shown in FIG. 5B is only schematic, and those skilled in the art should understand that other data compressing manners may be adopted to further compress the data in the database record of the structure shown in FIG. 5A. The data in the database record of the structure as shown in FIG. 5B may also be further compressed.

According to one embodiment of the present invention, the compressing the time series data comprises: performing linear compression to the values in the time series data from each sensor. By performing linear compression to the values in time series data from each sensor, it may reduce the number of three tuples as shown in FIG. 5A or 5B which are needed to store.

In order to prevent affecting the continuity in depicting the process shown in FIG. 2, the embodiment of performing linear compression to the values of the sensors will be depicted infra in detail with reference to the accompanying drawings.

It should be noted that each database record in the first memory as shown in FIG. 5A and FIG. 5B uniquely corresponds to a sensor group; while a sensor group may correspond to multiple database records as shown in FIG. 5A or FIG. 5B.

The time series data from multiple sensors are received in time sequence. According to a conventional manner, before persistently storing time series data, it is required to store the received time series data in a temporary memory as per sensor, i.e., storing the time series data in a database record of a temporary memory as per sensor, wherein in one database record corresponding to one sensor, there records only time series data of the one sensor. In an application with a considerable number of sensors but a low sampling frequency, it requires a massive buffer space to support such storing manner.

As to the method according to the embodiments of the present invention, the received time series data are stored as per sensor group, wherein each database record in the first database in the first memory includes time series data from the sensors in the sensor group corresponding to the database record. In other words, this step stores the time series data from multiple sensors of one sensor group into one database record, which may effectively utilize the maximum length of the database record, thereby saving the space required for buffering.

Besides, the first storage step 230 may not only store the received time sequence data as per sensor group but also store the received time series data in a compressed manner, such that it may save storage space and more time series data may be stored in one database record.

According to one embodiment of the present invention, by setting an appropriate field in the database record(s) of the first database, various indexes may be built for the database, for example, maximum value index that comprises a mapping relationship between a maximum value in the time series data in the database record and the database record; minimum value index comprising a mapping relationship between a minimum value in the time series data in the database record and the database record; initial time index comprising a mapping relationship between the earliest timestamp in the time series data in the database record and the database record; an end time index comprising a mapping relationship between a latest timestamp in the time series data in the database record and the database record. The above indexes may be used to perform various searches for the time series data stored in the first database.

Now, return to FIG. 2, after step 230, the data reorganizing step 240 is performed to retrieve, from the first database, time series data from each sensor of the multiple sensors.

For example, when the first memory for storing the time series data from the sensors becomes full, or in a predetermined time after the first memory starts storing time series data, the time series data from each sensor of multiple sensors are retrieved from the first database. Specifically, the time series data from a sensor may be extracted from a database record of the sensor group to which the sensor belongs based on a mapping relationship between a sensor group and the sensor.

Referring to FIG. 4, table 412 in the figure schematically shows a part of time series data of a sensor retrieved from the first database by a data re-organizing step 240. The meanings of the headers "TS" and "V" in table 412 are identical to those in table 411, which need not be detailed here. For the convenience of depiction, suppose the 26 time series data as shown in Table 412 are a part of time series data from a sensor 100 in the sensor group G10.

After the data re-organizing step 240, a second storing step 250 is performed, in which time series data are stored in a second database DB2 of the second memory, such that multiple time series data from the same sensor are stored in at least one database record of the second database.

The second memory may be a non-volatile memory, for example, a magnetic disk, an optical disk, etc. The second database may be a relational database.

The database record in the second database may be expressed in the following expression (1):

$$\{ID, <V,T>, <V,T>, \ldots\} \quad (1)$$

wherein ID denotes the sensor identifier; multiple two-tuples <V, T> denote multiple time series data from the sensor represented by the sensor identifier. For example, suppose a database record of the second database includes the time series data shown in table 412, then the content of the database record may be expressed as:

$$\{G10, <3,20120806.10:00:00>, \ldots <5,20120806.10:00:25>\}$$

wherein G10 denotes the sensor identifier, <3,20120806.10:00:00> denote the time series data in the first row of table 412, and <5,20120806.10:00:25> denotes the time series data of the last row.

It should be noted that the expression (1) is only schematic. The database record in the second database may comprise more fields. The time series data stored in the database record may include more or less time series data compared with what is shown in Table 412. Besides, one sensor may correspond to multiple database records storing time series data from it. In practice, those skilled in the art may make various modifications to the structure as shown in expression (1) according to a possible need, for example, adding fields according to a need of searching in the second database.

According to one embodiment of the present invention, the second storing step 250 further comprises: storing time series data in a second database of the second memory as per timestamp. In other words, by further storing time series data as per time based on storing time series data as per sensor, it may facilitate later search in the second database based on sensors and time.

According to one embodiment of the present invention, before the second storing step 250, even before the first step 230, the time series data may be compressed to generate compressed time series data. Correspondingly, in the second storing step, the storing time series data in the second database of the second memory comprises storing compressed time series data in second database of the second memory.

According to one embodiment of the present invention, the compressing the time series data comprises: compressing the time stamp in the time series data.

FIG. 6A schematically shows a structure of a database record for storing time series data as per timestamp in a compressed manner according to one embodiment of the present invention. The database record shown in FIG. 6A is substantially identical to the database shown in FIG. 5B, except the difference between the sensor identifier 601 and the group identifier 501 and the difference between the two-tuple <V, Δt> and the three-tuple <ID, V, Δt). Specifically, it comprises the following fields:

a sensor identifier (ID) 601, denoting an identifier of a sensor;
a base timestamp (Base_TS) 602, denoting a base time;
a counter (V_Counter) 603;
value blob (V_Blob) 604, composed of multiple two-tuples <V, Δt> 604_1, wherein "V" in the two-tuple <V, Δt> denotes a value; "Δt" denotes an offset between the timestamp corresponding to the value "V" and the base timestamp 602. The <timestamp, value> pair corresponding to the two-tuple <V, Δt> may be derived from the <V, Δt> and the base timestamp 602.

The value of the counter 603 indicates the number of two-tuple 604_1.

For example, according to the structure shown in FIG. 6, the time series data as illustrated in table 412 may be stored in one database record. The content of the time series data may be schematically expressed below:

$$\{100, 20120816.10:00:00, 26, <3,0>, <3.3,1>, <3.6,2>, \ldots <5,25>\}$$

According to one embodiment of the present invention, the compressing the time series data includes: performing linear compression to the values in the time series data from each sensor.

According to one embodiment of the present invention, an appropriate field may be set in the database record of the structure shown in expression (1) or FIG. 6A, to build various indexes for the database record, for example, an initial time index including a mapping relationship between an earliest timestamp in the time series data in the database record and the database record; an end time index including a mapping relationship between a latest timestamp in the time series data in the database record and the database record. The above indexes may be used to perform various time-based searches for the time series data stored in the second database.

According to one embodiment of the present invention, the second storing step 250 further comprises: storing time series data in a second database of the second memory as per value.

According to one embodiment of the present invention, before the second storing step 250, the time series data may be compressed to generate compressed time series data. Correspondingly, in the second storing step, the storing time series data in the second database of the second memory comprises: storing compressed time series data in second database of the second memory.

According to one embodiment of the present invention, the compressing the time series data comprises: compressing the time stamp in the time series data.

Figure 7:
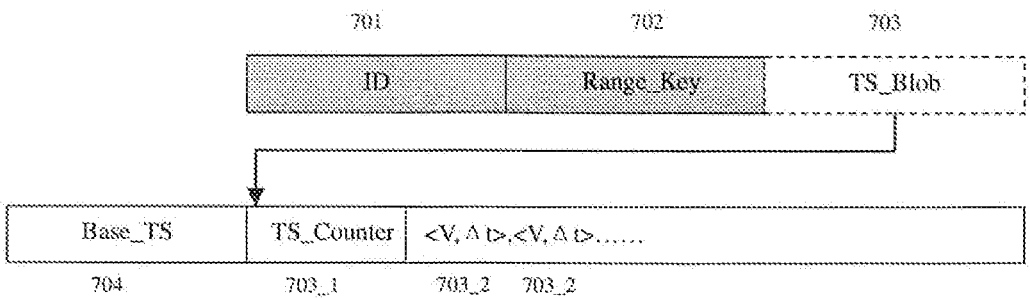
FIG. 7 schematically shows database records of time series data as stored in a second memory according to another embodiment of the present invention.

FIG. 7 schematically shows a structure of a database record for storing time series data as per value in a compressed manner according to one embodiment of the present invention. The database record as shown in FIG. 7 comprises the following fields:

a sensor identifier (ID) 701, denoting an identifier of a sensor;
a valve range key (Range_Key) 702, denoting a range of values stored in the database record;
a base timestamp (Base_TS) 704, denoting a base time;
timestamp blob (TS_Blob) 703, comprising:
◊ multiple two-tuples <V, Δt> 703_2, wherein "V" in the two-tuple <V, Δt) denotes a value; "Δt" denotes an offset between the timestamp corresponding to the value "V" and the base timestamp 704; therefore, <V, Δt> and base timestamp Base_TS 704 may represent the <timestamp, value> pair corresponding to the two-tuple <V, Δt>.
◊ counter (TS_Counter) 703_1, whose value indicates the number of two-tuple 703_2.

The difference between the database record structures of FIG. 7 and FIG. 6A mainly lies in that the structure in FIG.

7 comprises a value range key (Range_Key) 702 field, for denoting a value range of the values of time series data included in the database record. Since the values of the sensor at different times may differ greatly, it helps to promote the speed of search as per sensors and values in the second memory to limit, in the database record, the value range of the values of the stored time series data.

Various manners may be employed to divide the value range of values in time series data from a sensor. With the sensor 100 as an example, suppose the range of values of the time series data from the sensor is [−20, 20]. This range may be simply divided to 20 value ranges, i.e., [−20, −18], [−18, −16], . . . , [16, 18], and [18, 20]. A drawback of this dividing manner lies in that in practice, values of the sensor are distributed unevenly over each value range. In other words, there may be more values of the sensor in some value ranges, while fewer in some value ranges.

The values of each sensor distribute according to a certain rule. The actual distribution of values of each sensor may be utilized to divide the value range of the values of each sensor.

According to one embodiment of the present invention, the method shown in FIG. 2 further comprises: calculating a probability distribution function PDF of values from each sensor, and correspondingly, the storing time series data in a second database of a second memory as per values comprises:

dividing values from each sensor into multiple value ranges based on the calculated PDF;

storing time series data based on the divided value ranges, such that each database record comprises time series data corresponding to values within the same value range.

According to one embodiment of the present invention, before the first storing step 230, PDF of values of time series data from each sensor is calculated by making statistics on the time series data from the each sensor. For example, by making statistics on the time series data from the sensor 100, the probability distribution function PDF of the values of the sensor 100 may be calculated as:

$$f(x) = \frac{1}{\sqrt{2\pi}\,\sigma} e^{-\frac{(x-\mu)^2}{2\sigma^2}}, \mu = 0, \sigma = 6$$

Namely, the value of the sensor 100 conforms to a normal distribution, wherein μ denotes a desired value of a value of the sensor, and σ denotes a standard deviation.

Based on the calculated probability distribution function PDF of the values of the sensor 100, the sampling range covered by the probability distribution function is partitioned into K equal parts (here, it is set that K=20):

$$\int_{v_i}^{v_{i+1}} \frac{1}{\sqrt{2\pi}\,\sigma} e^{-\frac{(x-\mu)^2}{2\sigma^2}}\, dx = \frac{1}{K}, K = 20$$

wherein K denotes the number of value ranges partitioned to have equal probability; $v_i$ denotes an initial dividing point of the $i^{th}$ portion; $v_{i+1}$ denotes an end dividing point of the $i^{th}$ portion and also the initial dividing point of the $i+1^{th}$ portion. The result is shown in table 1.

TABLE 1

| Value Range Key | Minimum Value | Maximum Value |
| --- | --- | --- |
| . . . | . . . | . . . |
| 13 | 1.5 | 2.34 |
| 14 | 2.34 | 3.18 |
| 15 | 3.18 | 4.08 |
| 16 | 4.08 | 5.04 |
| . . . | . . . | . . . |

Table 1 merely schematically shows 4 among 20 value ranges, wherein, the value range corresponding to the value range key 13 is [1.5, 2.34], i.e., the maximum value and minimum value of the value range are 2.34 and 1.5, respectively. Similarly, the value ranges corresponding to value range keys 14, 15, and 16 are [2.34, 3.18], [3.18, 4.08], and [4.08, 5.04], respectively.

In this way, the time series data from the sensor 100 may be stored based on the divided 20 value ranges, such that each database record comprises time series data corresponding to values within the same value range. For example, in the database record as shown in FIG. 7, only the time series data corresponding to values within the value range [1.5, 2.34] are stored. In other words, all values in each two-tuple <V, Δt> fall within the range [1.5, 2.34]; correspondingly, the value of the value range key 702 is 13.

In practical application, a mapping relationship between a value range key (Range_Key) and a value range represented thereby, so as to facilitate value-based query with respect to the second database.

Figure 8:
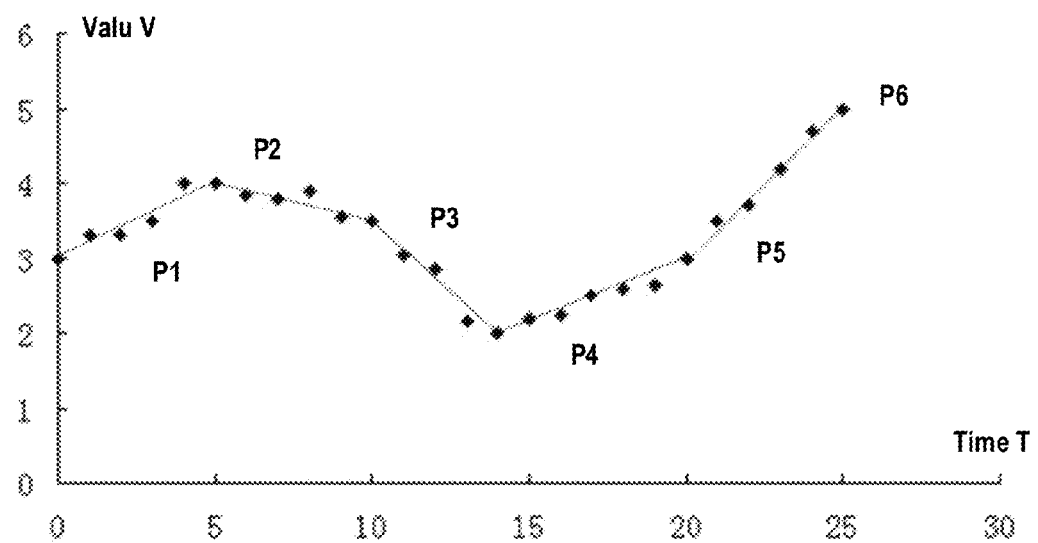
FIG. 8 is a diagram of time series data from sensors.

FIG. 8 is a diagram of time series data from a sensor. Now, refer to FIG. 8 to illustrate an example of linearly compressing time series data to generate compressed data. Those skilled in the art know that linear compression is a common data compression technology, and the prior art has already proposed various linear compression algorithms and corresponding decompression algorithms.

FIG. 8 schematically shows time series data shown in table 412 of FIG. 4, wherein the transversal axis denotes time T, with a unit of second; the longitudinal axis denotes value V; the 26 points in FIG. 8 denote 26 time series data in table 412, wherein 6 points P1, P2, P3, P4, P5, and P6 denote the time series data in the 1st, 6th, 11th, 15th, 21st, 26th lines in table 412, respectively. For example, the coordinate of the point P1 is (0, 3), which denotes the 1st time series data, i.e., <TS, V>=<2012-08-06.10:00:00.000, 3>. The connecting lines P1-P2, P2-P3, P3-P4, P4-P5, and P5-P6 of the six points form a continuous trace polygon.

It is seen from FIG. 8 that the points corresponding to the 2nd, 3rd, 4th, and 5th time series data all fall nearby the connecting line P1-P2, which indicates that within a predetermined error range (for example, 0.2), linear compression may be performed to the 1st-6th time series data, i.e., using the time series data represented by point set {P1, P2} to represent the 1st-6th time series data.

In this way, the 26 time series data in table 412 may be compressed into time series data represented by 6 points P1, P2, P3, P4, P5, and P6. Specifically, the 6th-11th time series data are presented by the time series data represented by the point set {P2, P3}; the 11th-15th time series data are represented by the time series data represented by point set {P3, P4}; the 15th-21st time series data are represented by the time series data represented by point set {P4, P5}; and the 21st-26th time series data are represented by the time series data represented by point set {P5, P6}. The time series data represented by point set {P1, P2, P3, P4, P5, P6} are compressed time series data generated by performing linear compression to the values of the time series data shown in Table 412.

Figure 6B:
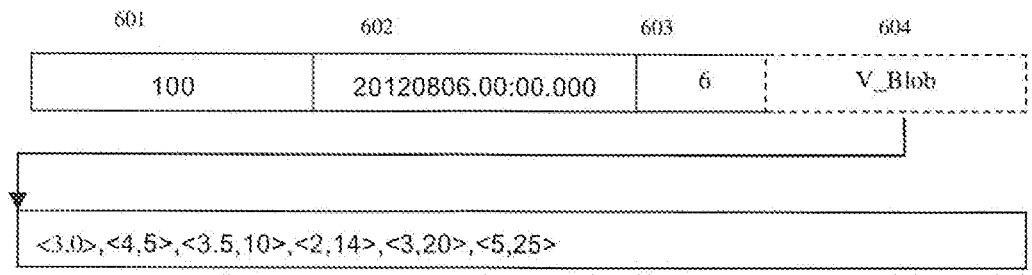

For example, the compressed time series data may be stored in the database record as shown in FIG. 6A, and the result is shown in FIG. 6B. In FIG. 6B, the value blob 604 merely stores compressed time series data {<3,0>,<4,5>, <3.5,10>,<2,14>,<3,20>,<5,25>} generated by performing linear compression to the values of the time series data shown in Table 412.

Similarly, such compressed time series data may be stored in the timestamp blob 703 as shown in FIG. 7.

Similarly, such compressed time series data may be stored in the point blob 504 as shown in FIG. 5B. According to one embodiment of the present invention, when or before performing the first storing step 230, linear compression may be performed to values of each sensor, and the compressed time series data may be stored in the first database of the first memory. In this way, when performing the data re-organizing step 240, compressed time series data from each sensor of multiple sensors may be acquired from the first database, such that in the second storing step 250, the acquired compressed time series data are stored in the second database of the second memory.

Those skilled in the art know that the compressed time series data generated according to a predetermined linear compression solution may be decompressed through linear interpolation. As far as the above depicted linear compression solution is concerned, for example, by performing data interpolation over the connecting line P1-P2, the decompressed 2nd, 3rd, 4th, and 5th time series data may be obtained. The error between the obtained decompressed 2nd, 3rd, 4th, 5th time series data and the raw 2nd, 3rd, 4th, 5th time series data may be controlled within a predetermined range, and even may be ignored.

The above depicted process of a method for processing time series data involves storing time series data, comprising: temporarily storing time series data in the first memory, transferring the temporarily stored time series data in the first memory to the second memory; then, temporarily storing the time series data in the first memory. By adopting the above method as illustrated in various embodiments, the utilization efficiency of temporarily storing time series data from massive low-frequency sensors using a temporary memory may be promoted, and the utilization efficiency of the memory for persistently storing time series data may also be promoted, thereby the performance of the whole database system is improved. It should be noted that the sequence of the steps in the method of FIG. 2 is only exemplary, which may have many variations in practice. Thus, the sequence of respective steps shown in FIG. 2 does not apply a strict limitation to the present invention. Further, besides the above manner of compressing time series data as depicted with examples, the present invention may also adopt other data compression algorithms to compress time series data, for example, compressing time series data by a quantitative compression method.

After storing the time series data according to the above method, query may be performed in response to a query request for time series data. According to one embodiment of the present invention, querying time series data generally comprises the following steps:

S1: a query receiving step, for receiving a query to time series data.

S2: a query step, for performing a query to time series data in the second memory.

Those skilled in the art should understand that the time series data query manner depends to a great extent on the time series data storage manner, including the compression manner of time series data and a data structure of storing the compressed time series data. In specific implementation, a corresponding retrieval program may be designed based on the storage manner of time series data.

Regarding the above query step, in the case of compressed time series data in the second memory, according to one embodiment of the present invention, the query step may further comprise the following steps:

S21: a query converting step, for converting the received query into a query to compressed time series data in the second memory;

S22: a compressed data query step, for performing a query to compressed time series data in the second memory to obtain a query result;

S23: a decompression step, for decompressing the compressed time series data in the obtained query result.

Alternatively, the query to time series data in the first memory may also be performed in a manner similar to that in the second memory. It is because that although the main function of the first memory is to temporarily store time series data received from a sensor, the time cycle for temporarily storing time series data in the first memory may last as long as a few days; therefore, dependent on the time range of the sensor involved with the query, it is very likely required to perform a query to time series data in the first memory.

What have been depicted above are various embodiments of a method for processing time series data according to the present invention. According to the same invention idea, the present invention further provides an apparatus for processing time series data.

Figure 3:
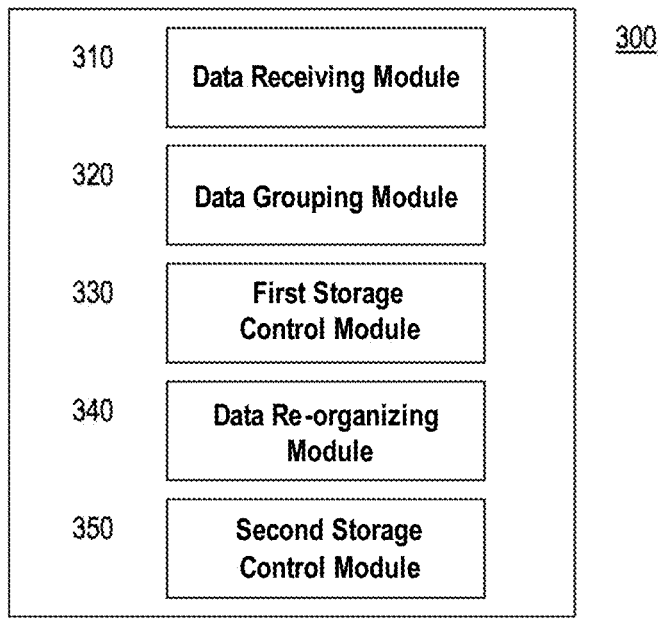
FIG. 3 schematically shows a schematic block diagram of an apparatus according to an embodiment of the present invention.

Refer to FIG. 3, it schematically shows a schematic block diagram of an apparatus 300 according to one embodiment of the present invention. The apparatus 300 is for processing time series data from multiple sensors, wherein the multiple sensors are divided into multiple sensor groups, each time series data comprising a timestamp and a value associated with the timestamp. As shown in the figure, the apparatus 300 generally comprises: a data receiving module 310, a data grouping module 320, a first storage control module 330, a data re-organizing module 340, and a second storage control module 350.

The data receiving module 310 is configured to receive time series data from each sensor of multiple sensors.

The data grouping module 320 is configured to assign the time series data received from each sensor to a sensor group to which the sensor belongs among the multiple sensor groups;

The first storage control module 330 is configured to store time series data in a first database of a first memory, such that the multiple time series data assigned to the same sensor group in the multiple sensor groups are stored in at least one database record of the first database.

The data re-organizing module 340 is configured to obtain the time series data of each sensor among the multiple sensors from the first database.

The second storage control module 350 is configured to store time series data in a second database of a second memory, such that the multiple time series data from the same sensor are stored in at least one database record of the second database.

According to one embodiment of the present invention, the second storage control module 350 is configured to further store time series data as per timestamp.

According to one embodiment of the present invention, the second storage control module 350 is configured to further store time series data as per value.

According to one embodiment of the present invention, the apparatus 300 may further comprise: a module (not shown) configured to calculate a probability distribution function PDF of values from each sensor, and the second storage control module 350 is further configured to divide the values from each sensor into a plurality of value ranges based on the calculated PDF; and to store the time series data as per the divided value ranges, such that a database record includes time series data corresponding to values within the same value range.

According to one embodiment of the present invention, the apparatus 300 further comprises: a data compression module (not shown) configured to compress time series data for each sensor to generate compressed time series data.

According to one embodiment of the present invention, the data compression module comprises one or more of the following: a module configured to compress timestamps in the time series data; a module configured to perform linear compression to the values in the time series data from each sensor.

According to one embodiment of the present invention, the first storage control module 330 is further configured to store compressed time series data in the first database of the first memory.

According to one embodiment of the present invention, the second storage control module 350 is further configured to store compressed time series data in the second database of the second memory.

According to one embodiment of the present invention, the apparatus 300 further comprises: a query receiving module (not shown) configured to receive a query to time series data; a query module (not shown) configured to perform a query to time series data in the second memory.

According to one embodiment of the present invention, the query module comprises: a query converting module configured to convert the received query into a query to the compressed time series data in the second memory; a compressed data query module configured to perform a query to compressed time series data in the second memory to obtain a query result; a decompression module configured to decompress the compressed time series data in the obtained query result.

What have been depicted above are various embodiments of an apparatus for processing time series data according to the present invention. Since various embodiments of the method for processing time series data according to the present invention have been depicted above, in the depiction of various embodiments of the apparatus for processing time series data, those contents repetitive to the depiction of the various embodiments of the method for processing time series data, or those contents that may be derived therefrom, are omitted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for processing time series data from multiple sensors, wherein the multiple sensors are divided into multiple sensor groups and each time series data comprises a time stamp and a value associated with the timestamp, the method comprising:
   receiving, at a processor, time series data from each sensor of the multiple sensors;
   assigning, by the processor, the time series data received from each sensor to a sensor group to which the sensor belongs among the multiple sensor groups;
   storing, by the processor, time series data in a first database of a first memory, such that multiple time series data assigned to the same sensor group in the multiple sensor groups are stored in at least one database record of the first database;
   obtaining, by the processor, the time series data of each sensor among the multiple sensors from the first database;
   storing, by the processor, time series data in a second database of a second memory, such that the multiple time series data from the same sensor are stored in at least one database record of the second database, compressing, by the processor, the time series data for each sensor by compressing the timestamps in the time series data to generate compressed time series data for storage in said at least one database record of the first database; and
   wherein the compressing the timestamps in the time series data by the processor comprises:
   obtaining a base timestamp denoting a base time for obtaining data from a particular sensor in the time series data;
   generating for each sensor of a sensor group, a plurality of three-tuples, each three-tuple comprising an identifier of a sensor in the group, the obtained sensor value for that sensor, and a corresponding offset between the timestamp corresponding to the sensor value and the base time stamp.

2. The method according to claim 1, wherein the storing of time series data in a database of a second memory further comprises: storing time series data as per the timestamps.

3. The method according to claim 1, wherein the storing of time series data in a database of a second memory further comprises: storing time series data as per the values.

4. The method according to claim 3, further comprising: calculating a probability distribution function PDF for values from each sensor, and the storing time series data as per the values comprising:
dividing the values from each sensor into multiple value ranges based on the calculated PDF; and
storing time series data based on the divided value ranges, such that one database record comprises time series data corresponding to values within the same value range.

5. The method according to claim 1, wherein the compressing time series data comprises:
performing linear compression to the values in the time series data from each sensor.

6. The method according to claim 5, wherein the storing time series data in a first database of a first memory comprises: storing the compressed time series data in the first database of the first memory.

7. The method according to claim 5, wherein the compressing time series data comprises: performing linear compression to values in time series data from each sensor, and the storing time series data in a second database of a second memory comprises: storing the compressed time series data in the second database of the second memory.

8. The method according to claim 1, further comprising: receiving, by the processor, a query to the time series data; and performing, by the processor, a query to the time series data in the second memory.

9. The method according to claim 8, wherein the query step comprises:
converting, by the processor, the received query into a query to the compressed time series data in the second memory;
performing, by the processor, a query to the compressed time series data in the second memory to obtain a query result; and
decompressing, by the processor, the compressed time series data in the obtained query result.

10. An apparatus for processing time series data from multiple sensors, wherein the multiple sensors are divided into multiple sensor groups and each time series data comprises a time stamp and a value associated with the timestamp, the apparatus comprising:
a hardware processor;
a memory storage device for storing programming instructions configuring the hardware processor to:
receive time series data from each sensor of the multiple sensors;
assign the time series data received from each sensor to a sensor group to which the sensor belongs among the multiple sensor groups;
store time series data in a first database of a first memory, such that multiple time series data assigned to the same sensor group in the multiple sensor groups are stored in at least one database record of the first database;
obtain the time series data of each sensor among the multiple sensors from the first database;
store time series data in a second database of a second memory, such that the multiple time series data from the same sensor are stored in at least one database record of the second database, generate compressed time series data for each sensor by compressing the timestamps in the time series data of the sensors; and
wherein to compress the timestamps in the time series data of the sensors, the hardware processor is further configured to:
obtain a base timestamp denoting a base time for obtaining data from a particular sensor in the time series data;
generating for each sensor of a sensor group, a plurality of three-tuples, each three-tuple comprising an identifier of a sensor in the group, the obtained sensor value for that sensor, and an offset between the timestamp corresponding to the sensor value and the base time stamp.

11. The apparatus according to claim 10, wherein the hardware processor is further configured to further store time series data as per the timestamps.

12. The apparatus according to claim 10, wherein the hardware processor is further configured to further store time series data as per the values.

13. The apparatus according to claim 12, wherein the hardware processor is further configured to:
calculate a probability distribution function PDF for values from each sensor, divide the values from each sensor into multiple value ranges based on the calculated PDF; and
store time series data based on the divided value ranges, such that one database record comprises time series data corresponding to values within the same value range.

14. The apparatus according to claim 10, wherein the hardware processor is further configured to:
perform linear compression to the values in the time series data from each sensor.

15. The apparatus according to claim 14, wherein the hardware processor is further configured to:
store the compressed time series data in the first database of the first memory.

16. The apparatus according to claim 14, wherein the hardware processor is further configured to:
store the compressed time series data in the second database of the second memory.

17. The apparatus according to claim 10, wherein the hardware processor is further configured to:
receive a query to the time series data; and
perform a query to the time series data in the second memory.

18. The apparatus according to claim 17, wherein the hardware processor is further configured to:
convert the received query into a query to the compressed time series data in the second memory;
perform a query to the compressed time series data in the second memory to obtain a query result; and
decompress the compressed time series data in the obtained query result.

* * * * *